(12) United States Patent
Gruen et al.

(10) Patent No.: US 6,185,886 B1
(45) Date of Patent: Feb. 13, 2001

(54) FIXING ELEMENT FOR REINFORCEMENT CONNECTION WITH A SECONDARY ACTION, ESPECIALLY FOR EARTHQUAKE-RESISTANT SECUREMENT

(75) Inventors: Juergen Gruen, Boetzingen; Axel Braun, Teningen; Joachim Schaetzle, Kenzingen; Christian Weber, Emmerdingen, all of (DE)

(73) Assignee: fischerwerke Artur Fischer GmbH & Co. KG, Waldachtal (DE)

( * ) Notice: Under 35 U.S.C. 154(b), the term of this patent shall be extended for 0 days.

(21) Appl. No.: 09/301,006

(22) Filed: Apr. 28, 1999

(51) Int. Cl.[7] ................................ E04C 5/16; E04C 5/18
(52) U.S. Cl. ..................... 52/223.13; 52/704; 52/707; 52/740.5
(58) Field of Search ..................... 52/125.4, 223.13, 52/704, 707, 740.5

(56) References Cited

U.S. PATENT DOCUMENTS

| 1,333,880 | * | 3/1920 | Stine | 52/707 |
| 5,170,606 | * | 12/1992 | Popp | 52/707 |

FOREIGN PATENT DOCUMENTS

| 0 356 524 B1 | 9/1992 | (EP) . |
| 0 455 952 B1 | 11/1993 | (EP) . |

* cited by examiner

*Primary Examiner*—Christopher T. Kent
(74) *Attorney, Agent, or Firm*—Michael J. Striker

(57) ABSTRACT

A fixing element providing a reinforcement connection with a secondary action and settable in a drill hole by a hardenable composition the fixing element has a reinforcement rod, and at least one conical sleeve provided on the reinforcement rod, the at least one conical sleeve having a segment-shaped construction.

9 Claims, 4 Drawing Sheets

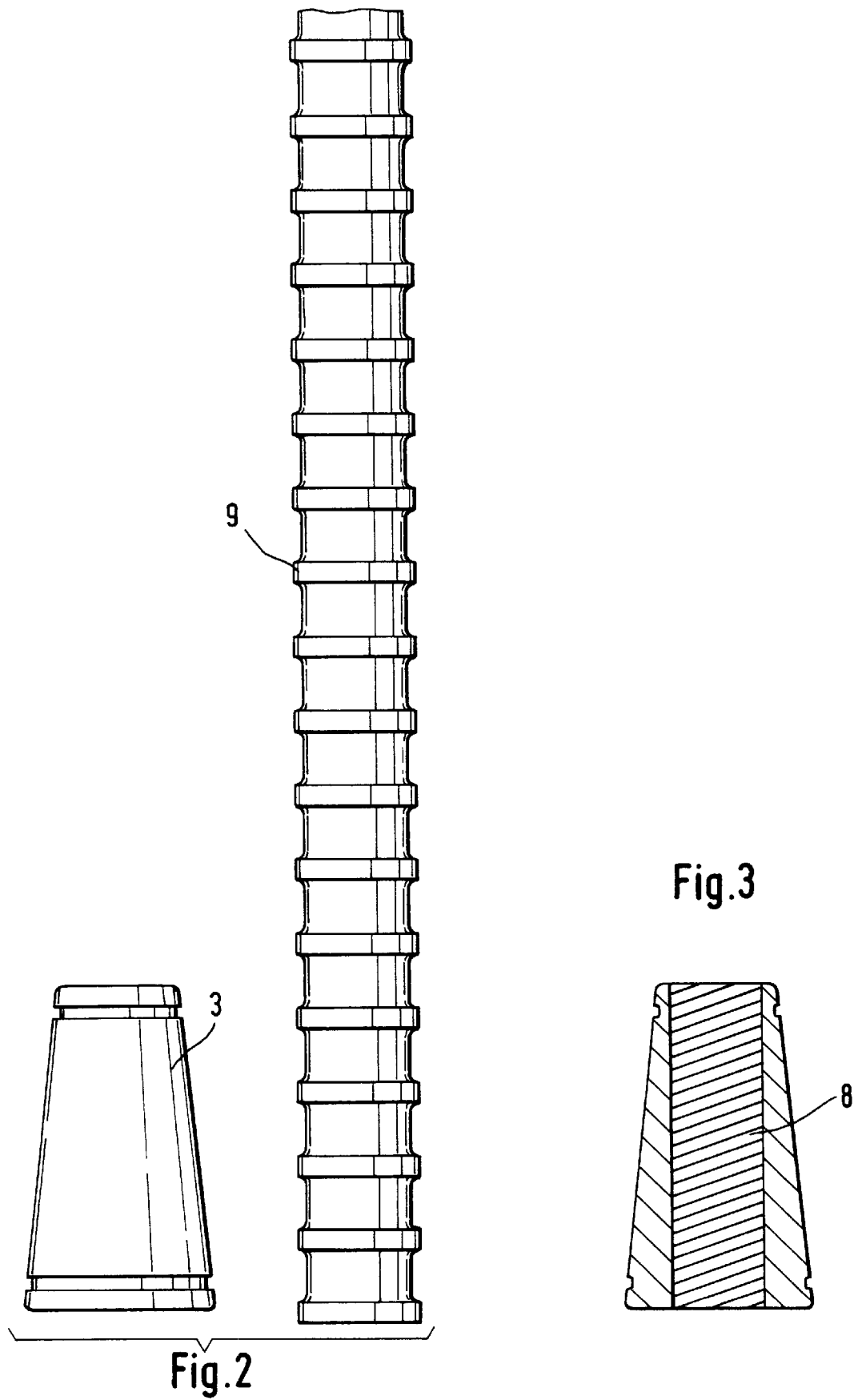

FIXING ELEMENT FOR REINFORCEMENT CONNECTION WITH A SECONDARY ACTION, ESPECIALLY FOR EARTHQUAKE-RESISTANT SECUREMENT

BACKGROUND OF THE INVENTION

The present invention relates to fixing elements for reinforcement connection with a secondary action, especially for earthquake-resistant securement.

Reinforcement rods are frequently used to strengthen building structures using a hardenable composition in the drill hole. It has proved a disadvantage that, during the lifetime of the fixing, large cracks occur in the concrete, especially in the event of shock loading, such as during an earthquake, and the anchoring can fail.

Fixing elements are known which consist substantially of a threaded bolt, an expansible sleeve and an expander body with expander cone that can be drawn into the expansible sleeve. The expansible sleeve has longitudinal slots, which allow the expansible sleeve to expand as the expander body is drawn in. These fixing elements are generally set in an undercut drill hole with which the expanded sleeve forms an interlocking fit.

European patent document EP 0 455 952 Bi describes a fixing element for fixing in a substrate affected by momentary shock loading, such as that occurring during an earthquake. To avoid failure of a fixing in the event of shock loading, in this case a bolt and a complementary expansible sleeve are proposed. The expansible sleeve has two expanding portions, the first cylindrical portion having the smallest diameter of the expander cone and a second conically widening portion having the largest diameter, the continuation of which is cylindrical. It has proved to be a disadvantage of the known fixing element that in the event of shock loading considerable axial slippage occurs, and the component becomes loose, so that a new fixing element has be used following the overloading. Furthermore, mounting in an undercut is complicated, because the undercut has to be prepared, and for many applications is too expensive.

An anchor stud for a synthetic resin adhesive is known, having a shank that has several cones arranged in the axial direction european patent document (EP 0 356 425). This known anchor stud is set in the drill hole by means of a hardenable composition. This known anchor stud is not suitable as a replacement for a reinforcement rod, since only the proper standardized reinforcement rods permit a reinforcement connection.

SUMMARY OF THE INVENTION

The invention is based on the problem of producing a fixing element for a reinforcement connection with a secondary action, especially for earthquake resistant securement, which can be manufactured economically and permits uncomplicated and secure anchoring.

In keeping with these objects and with others which will become apparent hereinafter, one feature of present invention resides, briefly stated, in a fixing element for reinforcement connection with a secondary action, which element is set in a drill hole by means of a hardenable composition, wherein in accordance with the inventive feature, the reinforcement rod is provided with one or more conical sleeves, and the conical sleeves are of a segment-shaped construction.

Because the reinforcement rod is provided with one or more conical sleeves, and the annular gap between the drill hole wall and the reinforcement rod is filled with a hardenable composition, when subjected to shock loading the hardened mortar shell is pressed by the conical sleeve against the drill hole wall and the anchoring is maintained. The construction of the reinforcement rod according to the invention and mounting thereof by means of a hardenable composition provides a system for a reinforcement connection that withstands cracks, with which different anchoring depths are possible. To facilitate sliding of the conical sleeve in the mortar shell, a dry film can be disposed on the surface of the segments.

In the event of sustained shock loading, cracks occur in the concrete. To ensure a safe reinforcement connection in this case, the reinforcement rod is additionally provided in its upper region with a plastics material sleeve, so that a non-adhering, low-friction surface is produced and the reinforcement rod is able to slide up subsequently as required, and the mortar shell formed is pressed by the conical sleeve against the wall of the drill hole. This embodiment is especially suitable for reinforcement connections having relatively short anchoring depths. Instead of a plastics material sleeve, the reinforcement rod can be provided with a coating agent. Coatings of wax-like synthetic polymer, polytetrafluoroethylene, silicone polymer or galvanically applied coverings have proved suitable. An other option is to sheathe the reinforcement rod in a deep-drawn, rigid plastics material sleeve. Other means can also be employed to achieve the low friction value.

For prolonged shock loading, the formation of cracks is additionally accompanied by damage to the concrete as well, so that parts of the concrete, particularly in the upper region, break off. In that case, a longer anchoring depth is recommended. The segment-form construction of the conical sleeve enables reinforcement rods of different diameter to be used.

BRIEF DESCRIPTION OF THE DRAWINGS

FIG. 2 shows the outside of a conical segment according to FIG. 1 before it is mounted on the reinforcement rod;

FIG. 3 shows the inside of a conical segment of the inventive fixing element;

DESCRIPTION OF PREFERRED EMBODIMENTS

Figure 1:
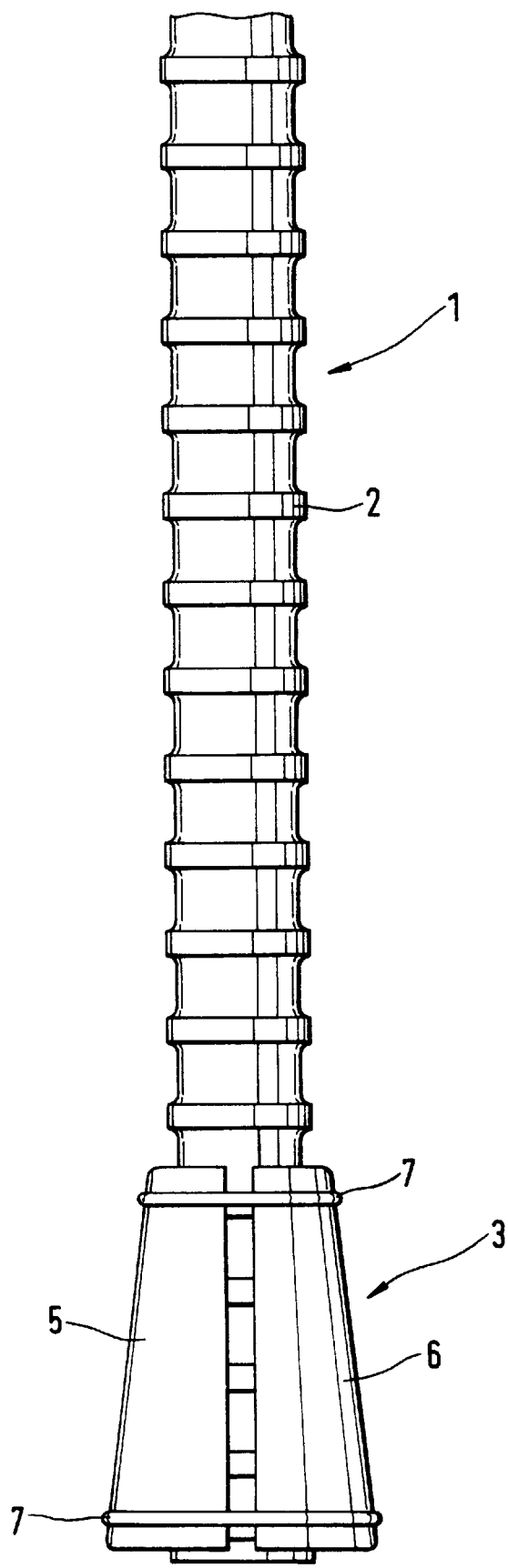
FIG. 1 shows the fixing element according to the invention in its complete state.
Figure 4:
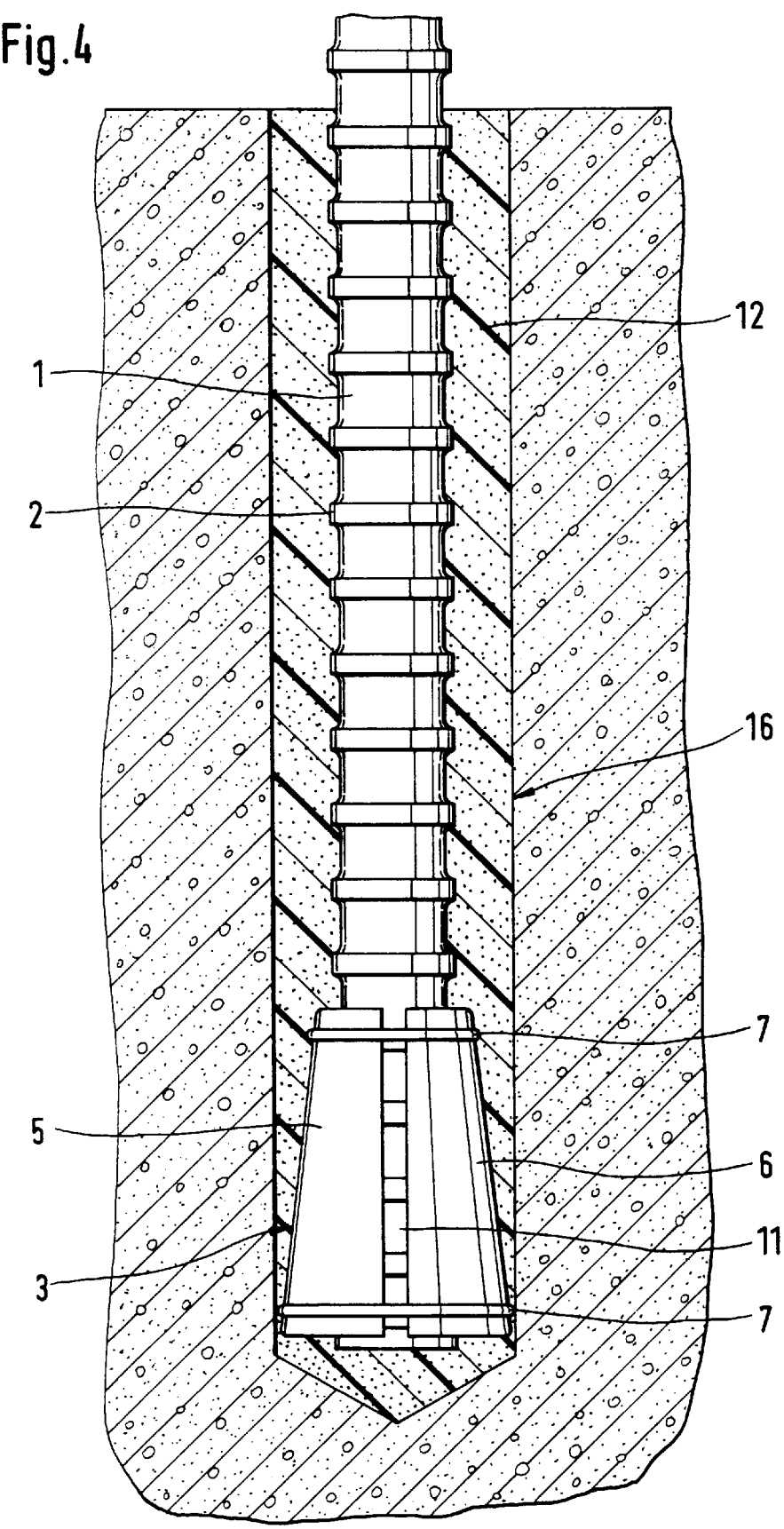
FIG. 4 shows an anchoring completed by means of the fixing element according to the invention.

A fixing element according to the invention illustrated in FIG. 1 has a reinforcement rod 1, with a profiling 2, on which a conical sleeve 3 is mounted. The conical sleeve 3 consists of two or more segments 5, 6 which are held together in each of the lower and upper regions by a respective ring or adhesive band 7. It is also possible for several conical sleeves to be arranged on the reinforcement rod. The conical sleeves 3 are positioned on the reinforcement rod 1 by locking a profiled inside 8 of the segment onto the reinforcement rod 1, as illustrated by FIGS. 3 and 4.

The reinforcement connection with secondary action is effected in that, after making and cleaning the drill hole a hardenable composition is injected into the drill hole and the reinforcement rod 1 is inserted into the composition. As this is done, the composition rises towards the mouth of the drill hole, so that the entire annular gap 16 is filled with composition 12, as shown in FIG. 4.

When cracks occur, the conical sleeves press the mortar shell against the drill hole wall, so that subsequent expansion by the reinforcement rod is able to occur and the anchoring is maintained.

Figure 5:
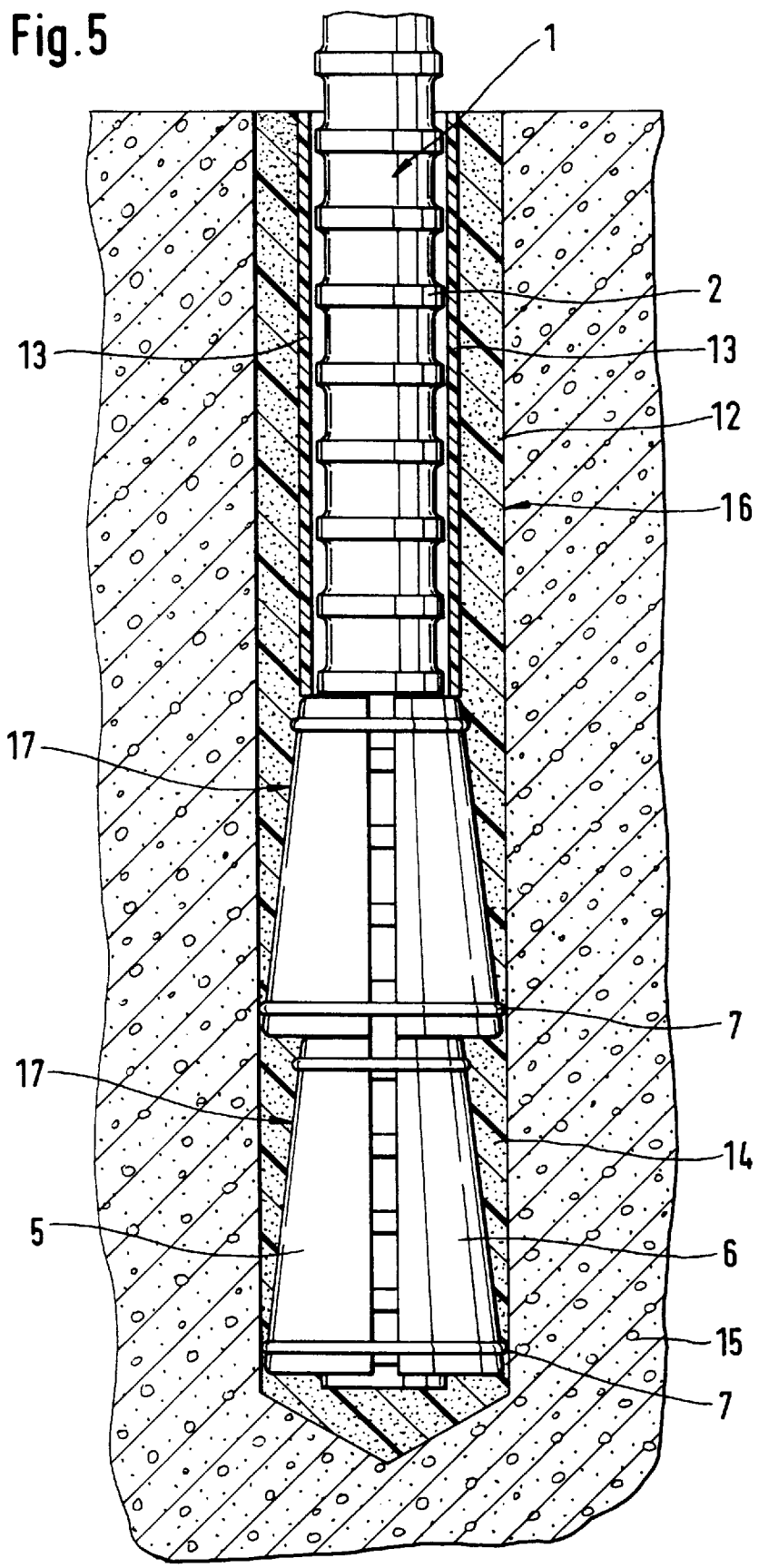
FIG. 5 shows an anchoring completed by means of the fixing element according to the invention with a plastics material sleeve.

The fixing element shown in FIG. 5 consists of a reinforcement rod 12 having a profiling 2, on which two conical sleeves 3 are mounted. The conical sleeves 3 consist of conical segments 5, 6, which are held together in each of the upper and lower regions by means of a respective ring or adhesive band 7. The reinforcement rod is provided in the upper region with plastics material. sleeve 132 which ensures that a bond-free region when the reinforcement rod 1 is cemented into the hardenable composition 12. Positioning of the conical sleeve 3 on the reinforcement rod 1 is effected by locking the profiled inside 8 of the conical segment onto the reinforcement rod 1. The inner profiling 8 of the segment can achieved by knurling; or applying corrugations or threads.

The reinforcement connection with secondary action is effected as follows: after making a drill hole in a substrate and cleaning the hole, the hardenable composition 12 is injected into the drill hole and the reinforcement rod its inserted. As the annular gap 16 fills with hardenable composition 12, in the region of the plastics material sleeve 13 located on the reinforcement rod a bondAree area remains, so that during protracted loading the reinforcement rod is able to slide up subsequently. As it does so, the mortar shell is pressed against the drill hole wall and the anchoring is maintained. By virtue of the segment-form construction of the conical sleeve 3, reinforcement rods of different diameters can be used with the conical sleeve.

It will be understood that each of the elements described above, or two or more together, may also find a useful application in other types of constructions differing from the types described above.

While the invention has been illustrated and described as embodied in a fixing element for reinforcement connection, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A fixing element providing a reinforcement connection with a secondary action and settable in a drill hole by a hardenable composition, the fixing element comprising a reinforcement rod; and at least one conical sleeve provided on said reinforcement rod, said at least one conical sleeve having a segment-shaped construction.

2. A fixing element as defined in claim 1; and further comprising at least another conical sleeve provided on said reinforcement rod and having a segment-shape construction.

3. A fixing element as defined in claim 1, wherein said reinforcement rod has a lower region provided with said at least one conical sleeve and an upper region; and further comprising a plastic material sleeve provided in said upper region of said reinforcement rod and surrounding said reinforcing rod.

4. A fixing element as defined in claim 1, wherein said conical sleeve is formed so that a gap is formed between said conical sleeve and a wall of the drill hole, said gap being filled with the hardenable composition.

5. A fixing element as defined in claim 1, wherein said at least one sleeve has an interior provided with a profiling.

6. A fixing element as defined in claim 1, and further comprising means for providing an interlocking engagement of at least one conical sleeve with said reinforcement rod.

7. A fixing element as defined in claim 2, and further comprising a ring which holds said conical sleeves together.

8. A fixing element as defined in claim 2, and further comprising an adhesive band which holds said conical sleeves together.

9. A fixing element as defined in claim 1, wherein said reinforcement rod has a lower anchoring region, said at least one conical sleeve being located in said lower anchoring region.

* * * * *